(12) United States Patent
Kusch (10) Patent No.: US 11,573,213 B2
(45) Date of Patent: Feb. 7, 2023

(54) METHOD FOR TIME-ALIGNMENT OF CHROMATOGRAPHY-MASS SPECTROMETRY DATA SETS

(71) Applicant: Thermo Fisher Scientific (Bremen) GmbH, Bremen (DE)

(72) Inventor: Sebastian Kusch, Bremen (DE)

(73) Assignee: Thermo Fisher Scientific (Bremen) GmbH

( * ) Notice: Subject to any disclaimer, the term of this patent is extended or adjusted under 35 U.S.C. 154(b) by 39 days.

(21) Appl. No.: 14/942,864

(22) Filed: Nov. 16, 2015

(65) Prior Publication Data
US 2016/0141164 A1   May 19, 2016

(30) Foreign Application Priority Data

Nov. 18, 2014   (GB) .................................... 1420466

(51) Int. Cl.
*G01N 30/86* (2006.01)
*G01N 30/72* (2006.01)

(52) U.S. Cl.
CPC ......... *G01N 30/8668* (2013.01); *G01N 30/72* (2013.01)

(58) Field of Classification Search
CPC ............. G01N 30/8668; G01N 30/72; G01N 30/8627; G01N 30/8631; G01N 30/8675; H01J 49/0036
USPC .......................................................... 702/89
See application file for complete search history.

(56) References Cited

U.S. PATENT DOCUMENTS

| 5,119,315 | A | 6/1992 | Kemp et al. | |
|---|---|---|---|---|
| 2002/0063208 | A1* | 5/2002 | Hastings | G01N 30/8624 250/281 |
| 2004/0113062 | A1* | 6/2004 | Norton | G01N 30/8624 250/282 |
| 2006/0131222 | A1* | 6/2006 | Norton | G06K 9/00536 210/198.2 |

(Continued)

FOREIGN PATENT DOCUMENTS

| EP | 2728350 A1 | 6/2011 |
|---|---|---|
| GB | 2404193 A | 1/2005 |

(Continued)

OTHER PUBLICATIONS

Mueller, et al., "SuperHirn—a novel tool for high resolution LC-MS-based peptide/protein profiling", Proteomics 7 (2007), pp. 3470-3480.

(Continued)

*Primary Examiner* — Michael P Nghiem (57) ABSTRACT

A method is disclosed for adjusting the time scale of chromatography-mass spectrometry data sets, wherein a time scale of a first data set is used as a reference time scale and wherein a time scale of at least one second data set is adapted to the reference time scale. The steps of the method include identifying feature groups in the first data set by evaluating intensities of consecutive points of the first data set; identifying feature groups in the second data set by evaluating intensities of consecutive points of the second data set; matching feature groups of the first data set to feature groups of the second data set, and determining a corrected time scale for the second data set based on time differences between feature groups in the first data set and matching feature groups in the second data set.

17 Claims, 5 Drawing Sheets

(56) References Cited

U.S. PATENT DOCUMENTS

| | | | |
|---|---|---|---|
| 2007/0112534 A1 | 5/2007 | Jaeger | |
| 2008/0046447 A1* | 2/2008 | Sadygov | G06K 9/00543 |
| 2008/0237457 A1* | 10/2008 | Yamashita | G01N 30/8665 |
| | | | 250/281 |
| 2012/0323985 A1* | 12/2012 | Du | G01N 30/8668 |
| | | | 708/446 |
| 2013/0131998 A1* | 5/2013 | Wright | G01N 30/8675 |
| | | | 702/27 |
| 2013/0297230 A1* | 11/2013 | Kawase | G01N 30/8662 |
| | | | 702/32 |
| 2014/0129169 A1 | 5/2014 | Noda | |
| 2014/0224973 A1* | 8/2014 | Sekiya | H01J 49/0481 |
| | | | 250/282 |
| 2014/0303903 A1* | 10/2014 | Fujita | H01J 49/0036 |
| | | | 702/23 |
| 2014/0324362 A1* | 10/2014 | Andersson | G06F 19/703 |
| | | | 702/28 |
| 2014/0361159 A1* | 12/2014 | Pfaff | H01J 49/0036 |
| | | | 250/282 |
| 2016/0025691 A1* | 1/2016 | Taneda | G01N 30/8637 |
| | | | 702/23 |
| 2017/0154169 A1* | 6/2017 | Paschke | G06F 19/703 |

FOREIGN PATENT DOCUMENTS

| | | |
|---|---|---|
| WO | 2003095978 A2 | 11/2003 |
| WO | WO 03/095978 A2 | 11/2003 |
| WO | 2013026026 A2 | 2/2013 |

OTHER PUBLICATIONS

Patterson, et al,, "Proteomics: the first decade and beyond," Nature Genetics 33 (2003), pp. 311-323.

Silva, et al., "Quantitative Proteomic Analysis by Accurate Mass Retention Time Pairs", Anal. Chem. 77 (2005), pp. 2187-2200.

* cited by examiner

METHOD FOR TIME-ALIGNMENT OF CHROMATOGRAPHY-MASS SPECTROMETRY DATA SETS

FIELD OF THE INVENTION

The invention relates to a method for adjusting the time scales of chromatography-mass spectrometry data sets. In addition, the invention relates to a data processing device and a mass spectrometry system.

BACKGROUND OF THE INVENTION

The development of ionization methods such as electrospray ionization of a sample carried by a solvent stream allowed for the application of mass spectrometry to biology and in particular a detailed analysis of processes at a cellular level, as discussed in the article by Patterson and Aebersold, nature genetics suppl. 33, 311 (2003). For the analysis of complex samples containing a plurality of individual molecules, liquid chromatography is often used to separate different molecules according to their retention time, i.e. the time from injection of the sample in the chromatography column to the elution of the respective molecules (retention time may also be termed elution time).

Figure 2A:
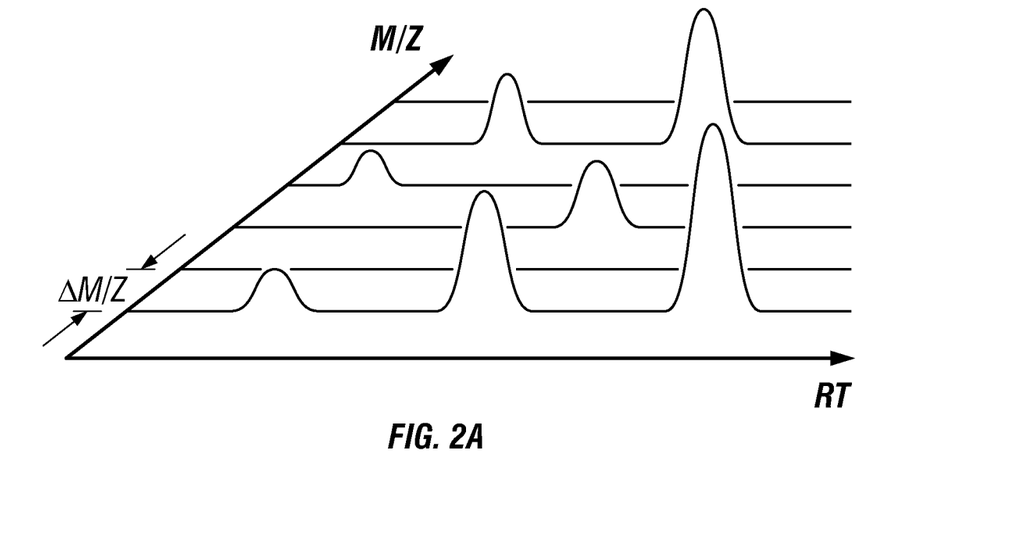
FIG. 2a) shows a simplified view of a data set representing a two-dimensional spectrum measured by a mass spectrometry setup, and FIG. 2b) shows an example detail of a measured mass chromatogram.

A single experiment in biological mass spectrometry generally requires measuring a large number of chromatography-mass spectrometry data sets containing the intensity or abundance of ions of varying mass-to charge ratios (m/z) and retention times. These two-dimensional spectra are measured by performing a mass scan at regular intervals of retention time; an example data set is shown in FIG. 2a); for simplicity, only horizontal traces of the two-dimensional field of discrete data points are depicted. A horizontal slice of a two-dimensional spectrum yields a mass chromatogram, indicating the measured intensity for ions in a particular mass-to-charge range as a function of retention time, whereas a vertical slice of a two-dimensional spectrum is a mass spectrum, indicating the measured intensity for ions of varying mass-to-charge ratio at a particular retention time interval. The presence of compounds is indicated by local maxima in intensity, termed features (or peaks). A single feature may span several retention time scan intervals and several mass-to-charge values (at least for high-resolution mass spectrometers).

Especially in metabolomics, where the effect of a drug on an organism is examined, a number of chromatography mass-spectrometry data sets need to be summed up or compared, e.g. spectrum of the sample to reference spectrum, or spectra measured at different times after administering a particular drug. These comparisons between corresponding spectra are rendered difficult by the fact that the retention times of spectra measured under generally identical experimental settings are shifted due to a number of reasons, such as changes in column chemistry over time, instrument drift or interactions among sample components.

In order to compensate for these drifts in the time scale, a variety of methods for adjusting the time scale of chromatography-mass spectrometry data sets are known. Generally, these methods comprise the steps of finding similar features in the two data sets to be aligned, matching the features of a first data set to features of a second data set, adjusting a shift function to the differences in retention time between matching features, and shifting the data points of the second data set relative to the first data set according to the shift function in order to synchronize the retention times.

WO03/095978 A2 discloses a computer-implemented method for time-aligning at least two chromatography-mass spectrometry data sets, each comprising a plurality of mass chromatograms, by computing a distance function between said data sets in dependence on at least two mass chromatograms from each data set and aligning said data sets by minimizing said distance function to obtain aligned data sets.

A similar approach to retention-time alignment is also described in the articles by Mueller et al., Proteomics 7 (2007), 3470-3480 and by Silva et al., Anal. Chem. 77 (2005), 2187-2200.

These methods rely on taking account of a large number of matched features, which makes them computationally expensive; yet they remain prone to systematic errors.

Against this background it is a goal of this invention to provide for a reliable adjustment of the time scales of corresponding chromatography mass-spectrometry data sets.

SUMMARY OF THE INVENTION

According to an aspect of the present invention there is provided a method for adjusting the time scale of chromatography-mass spectrometry data sets, in particular liquid chromatography-mass spectrometry data sets, wherein a time scale of a first data set is used as a reference time scale and wherein a time scale of at least one second data set is adapted to the reference time scale, comprising the steps of Identifying feature groups each comprising at least two features in the first data set by evaluating intensities of consecutive points of the first data set, Identifying feature groups each comprising at least two features in the second data set by evaluating intensities of consecutive points of the second data set, Matching identified feature groups of the first data set to identified feature groups of the second data set, and Determining a corrected time scale for the second data set based on time differences between feature groups in the first data set and matching feature groups in the second data set.

The time difference between consecutive points preferably lies in a given time interval; the minimum time interval is in particular given by the inverse of the measurement rate, whereas a maximum time interval can be chosen e.g. based on the sample, the solvent or the chromatography column used. A data set preferably contains an array of data points in an interval of mass-to-charge ratios and in an interval of retention times. The data set may contain profile mode spectra, i.e. mass scans taken in predefined retention time intervals, or preprocessed data, in particular centroid mode spectra, where in the mass scan for a fixed retention time position intensities of local maxima are determined by adjusting centroids to the mass-to-charge ratio scan in order to determine the center of a peak; in particular a peak list may be given for each retention time interval. A peak in the list is generally a local maximum in intensity over a defined mass-to-charge ratio range at a fixed retention time interval. Several features occurring at the same retention time (within a given tolerance) may form a feature group when the difference in mass-to-charge ratio and/or the difference in intensity or the intensity ratio between neighboring peaks comply with one or more conditions. Preferably, a time difference between a feature group in the first data set and a matching feature group in the second data set is determined based on a position in time of the feature group in the respective data set. The position of a feature group may in particular be determined based on the mean position of the features in the group.

When matching feature groups comprising a plurality of related features are determined, the possibility of false positives is significantly reduced compared to a matching of single features. As a consequence, each found match is more reliable, and a robust regression function may be based on less points. In contrast, matching of individual features may result in a failure when trying to automatically align different data sets when a retention time difference outside of a predetermined tolerance interval occurs. Retention time alignment based on matching of feature groups is more robust and more computationally efficient than brute force matching of all found single features or peaks.

Preferably identifying feature groups comprises identifying features by determining points of steepest ascent in a data set, especially based on differences in intensity between three or more consecutive data points, wherein in particular the data points considered are determined by summing up or averaging the intensities of data points in a given mass-to-charge ratio interval and a given retention time. Advantageously, the position of a point of steepest ascent is robust against small signal fluctuations. In principle, other peak identification methods could be used to identify features as known in the art.

According to a preferred embodiment of the invention, the data points are evaluated in traces of consecutive data points for a given mass-to-charge ratio interval, preferably by summing up or averaging the data points in the given mass-to-charge ratio interval, wherein in particular traces covering the whole data set are evaluated in parallel for identifying features. When preprocessed data sets contain peak lists, no summation is necessary; for the detection of a feature, consecutive peaks are those peaks whose center position differs by less than a given tolerance.

In a preferred embodiment of the invention, a feature is identified and/or a point is determined to be a point of steepest ascent when one or more, in particular all, of the following criteria are fulfilled:

Both the difference in intensity per difference in retention time between the point of steepest ascent and the immediately preceding point as well as the difference in intensity per difference in retention time between the immediately subsequent point and the point of steepest ascent are bigger than a predetermined threshold For the data points in a predefined first time interval prior to the point of steepest ascent, the intensity is higher than a predefined threshold and/or rises monotonically For at least one subsequent point in the data set, the intensity is less than or equal to the intensity at the point of steepest ascent.

The predefined first time interval may be limited to once or twice the difference in retention between consecutive data points.

It may be preferable that additional criteria or conditions need to be satisfied in order to identify a feature; in particular, a feature may only be identified when the time difference to a preceding identified feature is higher than a predetermined threshold.

Additionally a minimum width of a feature may be defined, in particular a minimum number of data points between the point of steepest ascent and a return point having less or equal intensity. Preferably, for a data set comprising multiple adjacent points with the same slope, a feature is identified based on the point of steepest ascent with the earliest time position.

Preferably a time position of the feature is determined based on one or more points in a time interval delimited by the point of steepest ascent and a return point, wherein the return point is the first point after the point of steepest ascent for which the intensity is equal to that of the point of steepest ascent within a given tolerance.

In particular, the time position or position in retention time of a feature is determined based on the mean value or the median of the points in the interval between the point of steepest ascent and the return point of the feature. Alternatively, the time position may be determined based on fitting a centroid to that time interval or by choosing the point of maximum intensity as time position of the feature. For determination of the return point, an interpolation between adjacent points of higher and lower intensity than the point of steepest ascent may be carried out. In a further alternative, the first subsequent point with a lower intensity than the point of steepest ascent may be taken to be the return point.

Preferentially the step of identifying feature groups in a data set comprises grouping of features, wherein features with position in a predefined time interval are grouped in a feature group when one or more predefined condition are fulfilled. In particularly preferred embodiments, a feature group corresponds to an isotopic pattern of a molecule.

Especially preferentially a predefined condition is fulfilled when at least three features were identified within the predefined time interval and the difference in mass-to-charge ratio from a first feature to a second feature is equal to the difference in mass-to-charge ratio from the second feature to a third feature within a given tolerance. A tolerance in mass-difference allows for recognizing corresponding peaks in spite of a slightly different mass defect. A fixed value may be chosen for the given tolerance; alternatively, the given tolerance may be varied depending on the charge attributed to the ions corresponding to the feature group.

Especially preferentially a predefined condition is fulfilled when at least three features were identified within the predefined time interval and the intensity ratio of at least three features corresponds to a predefined pattern. The predefined pattern may e.g. be chosen so that the feature corresponding to the lowest mass has the highest intensity; the intermediate feature preferably has a medium intensity and the feature corresponding to the highest mass has the lowest intensity. Accordingly known isotope patterns may be taken into account in order to avoid false positives, i.e. grouping of unrelated features.

Especially preferentially grouping of features comprises identifying the feature with maximum intensity in the predefined time interval and identifying one or more features with higher or lower mass-to-charge ratio, so that the difference in mass-to-charge ratio is in a predefined mass-to-charge ratio interval within a given tolerance. The interval may be chosen according to 1/z, where z denotes a charge state of the ion; in particular, all intervals corresponding to charge states up to a $z_{max}$ of e.g. 3 are tested when searching for additional features with higher or lower mass-to-charge ration than the feature with maximum intensity.

Preferably determining a corrected time scale comprises adjusting a predefined function to the time differences between feature groups found in the first data set and feature groups found in the second data set. The predefined function may be a linear function; alternatively, individual correction values may be given for each data point Especially preferably the predefined function is composed of locally defined functions and/or the method of adjustment of the predefined function is support vector regression or locally weighted scatterplot smoothing. Locally defined adaptable functions allow for a flexible adjustment and may be subject to smoothing over given interval. Preferably, the predefined function is model-free. A spline may be used to represent the predefined function.

Preferably more than two data sets are aligned, and the alignment is at least partially or initially performed pair wise, so that in a first step, a subordinate data set is aligned to an intermediate reference data set, and in a further step, a number of data sets comprising the intermediate reference data set and the subordinate data set are aligned to a primary reference data set. A number of subordinate data sets may be referenced to the intermediate reference data set; in a subsequent step, both intermediate reference data set and the number of subordinate data sets are referenced to the primary reference data set. More than one intermediate reference data sets may be used. Alternatively, a number of subordinate data sets may be referenced directly to the primary reference data set.

Especially preferably the order of pair wise alignment is chosen according to the time of measurement of the data set and/or a similarity index for comparing two data sets. In particular, a subsequent data set may be aligned to an immediately preceding data set, because this increases the probability of corresponding features. A similarity index may e.g. be determined based on the number of matching features or feature groups and/or the accumulated spectral distance between corresponding features in the data sets.

According to a further aspect of the invention, there is provided a data processing device, comprising a processor unit adapted to process chromatography-mass spectrometry data sets, a storage unit for saving and/or retrieving chromatography-mass spectrometry data sets and a non-volatile memory containing instructions for the processor unit to carry out the inventive method. The data processing device can be implemented as a single computer or in a distributed form with a number of processing devices interconnected by a wireless and/or wired and/or fiber-based network. Further, the processor unit may contain a plurality of processor cores in one or several interconnected units.

According to another aspect of the present invention, there is provided a mass spectrometry system comprising a liquid chromatography column, a mass spectrometer with an electrospray ionization source coupled to the liquid chromatography column, and a data processing device.

DETAILED DESCRIPTION OF EMBODIMENTS

In order to further understand the invention, embodiments will now be described in detail by way of example with reference to the accompanying drawings, which are for illustration only and are not intended to and do not limit the scope of the invention.

DETAILED DESCRIPTION OF EMBODIMENTS

Figure 1:
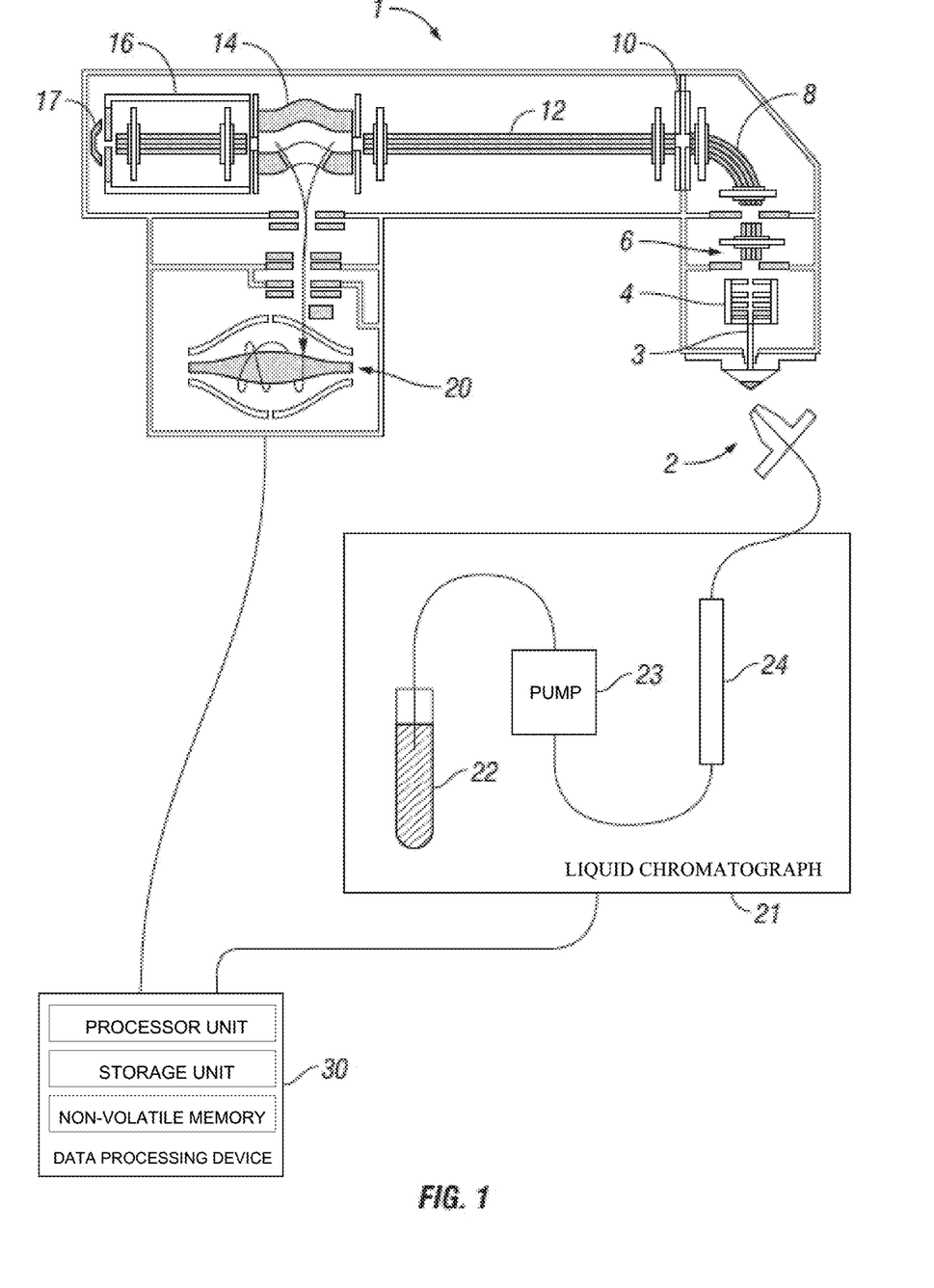
FIG. 1 shows a schematic view of a mass spectrometry system comprising a mass spectrometer coupled to a liquid chromatography-electrospray ionization source and a data processing device.

Referring to FIG. 1, a preferred embodiment of a mass spectrometry system is shown, comprising a mass spectrometer 1 utilizing an electrostatic trap in the form of an Orbitrap™ orbital trapping mass analyzer 20, a data processing device 30 and a liquid chromatography setup 21 connected to an electrospray ion source 2 operated at atmospheric pressure; sample eluted from the chromatography column is injected into the electrospray ion source.

Ions from the electrospray ion source 2 pass through a transfer capillary 3 to a stacked ring ion guide (S-lens) 4 and then through an injection flatapole 6 and a bent flatapole 8. Neutral clusters and droplets may fly unimpeded through gaps between the rods of the bent flatapole and thus do not contribute to the measured signal. The pressure in the region of the S-lens to the bent flatapole is typically 1-10 mbar, so that a degree of collisional cooling occurs in the bent flatapole. An ion gate 10 in the form of a fast split lens controls the entry of the ions into an RF-only transport multipole 12, which in the shown embodiment is an octapole and typically held at a pressure less than $10^{-4}$ mbar. In a preferred alternative embodiment, the transport multipole 12 is at least partially implemented as a quadrupole mass filter, thus allowing for a very fast mass selection, and may further comprise one or two additional lenses and/or an additional flatapole.

From the transport multipole the ions enter a C-trap 14 typically with a pressure therein of $(0.1-4.0)\times10^{-3}$ mbar (for example $5\times10^{-4}$ mbar). Optionally the ions may be passed for further cooling into a gas-filled dead-end Higher energy Collisional Dissociation (HCD) cell 16 comprising RF multipole rods typically with a pressure of $(1-20)\times10^{-3}$ mbar (e.g. $5\times10^{-3}$ mbar). From there the ions are passed back into the C-trap. The HCD cell is provided with an axial field for this purpose, e.g. by providing a retarding voltage on the back of the HCD. The HCD cell is separated from the C-trap by a single diaphragm, which allows easy tuning of the HCD cell. If required, the RF and axial field applied to the HCD cell can be set to provide for fragmentation of ions therein. The HCD cell allows better trapping while maintaining a certain pressure in the C-trap and thus in the Orbitrap mass analyzer 20, because the HCD cell is i) longer and ii) at a higher pressure than the C-trap. Ions are injected from the C-trap into the Orbitrap mass analyzer 20.

The vacuum in the Orbitrap compartment is preferably below $7\times10^{-19}$ mbar, although a pressure of up to $2\times10^{-9}$ mbar could be used. The m/z of larger, slower ions may be determined at such pressures in the Orbitrap mass analyzer, which may be due to the total travelled path that decreases with mass faster than the mean free path increases with mass. The number of ions in the Orbitrap mass analyzer is preferably controlled automatically (automatic gain control) by measuring the total ion charge using a short pre-scan before the analytical scan and from that calculating the ion injection time for the analytical scan. For high scan rates, the previous analytical scan can be used as the pre-scan to optimize the scan cycle time. Additionally or alternatively, an ion collector 17 may be placed behind the HCD collision cell and used for independent charge detection, which periodically (e.g. every 5-10 sec) checks and adjusts the accuracy of the automatic gain control. Transients detected by image current detection in the Orbitrap mass analyzer are processed in a data processing device using Fourier Transformation to convert the transient signals into frequency components and then m/z.

While the mass spectrometry setup described above contains a mass analyzer of the orbital trapping type, it will be appreciated that other mass analyzers may also be used, based e.g. on a time-of-flight measurement or a physical separation of the different masses in a sector field or mass-dependent losses such as in a quadrupole instrument. Further, the exact setup or combination of mass filter, collision cell and mass analyzer may be varied; for some electrostatic trap instruments, sequential application of suitable voltages may replace different stages of mass spectrometry that are physically separate in other instruments.

The liquid chromatography setup comprises a sample reservoir 22, a high-pressure pump 23 and a column 24. For simplicity, further elements of the liquid chromatography setup such as an autosampler or valves are not shown.

The data processing device 30 comprises an instrument interface, which is adapted to send commands to or operate the mass spectrometer 1 and liquid chromatography setup 21 and to receive measured data or status information from the instrument, a processor unit and a storage unit. Connection between data processing device 30 and mass spectrometer 1 and/or liquid chromatography setup 21 may be established by a wire or a glass fibre or wirelessly via radio communication. Preferably, the data processing device further comprises visualization means, in particular a display and/or a printer, and interaction means, in particular a keyboard and/or a mouse, so that the user can view and enter information.

The data processing device can be realized as a standard personal computer or in a distributed form with a number of processing devices interconnected by a wired or wireless network, so that the processor unit may contain a plurality of processor cores in one or several interconnected units. The functions for processing the data are preferably implemented in an object-oriented programming language such as C# or C++; frameworks such as .Net may be used. The storage unit is adapted to store measured data sets and preferably comprises memory devices which save information in the form of electrical charges, such as a random access memory, and/or memory devices which save information in the form of magnetic domains, such as a hard drive. Preferably, a chromatography-mass spectrometry data set is stored as a single file of a folder in the file system of the storage unit. When the data processing device comprises visualization means and interaction means, operation of the mass spectrometry setup is preferably controlled via a graphical user interface (GUI).

FIG. 2a) shows a simplified view of a chromatography-mass spectrometry data set representing a two-dimensional spectrum measured in a mass spectrometry setup as described above. The dataset is depicted in a projection, where the mass-to-charge ratio m/z varies along the y-axis and retention time RT varies along the x-axis; intensity of the detector signal is shown as height along the z-axis. For simplicity, only traces of integrated intensity for a predefined m/z-interval are shown. In a measured data set, the distance between adjacent traces may be given by the instruments mass resolution Δm/z.

Figure 2B:
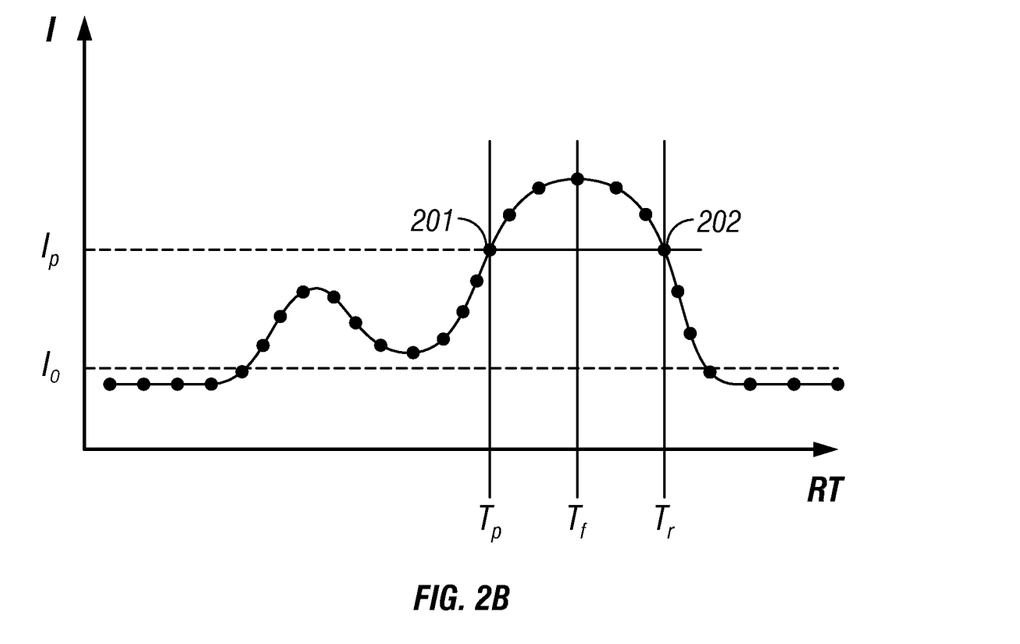

In FIG. 2b) an example detail of a measured mass chromatogram is shown, where signal intensity (corresponding to the abundance of ions) is shown as a function of retention time RT. To indicate the discrete measurements of a mass spectrum, the trace is shown as a series of discrete points. Chromatography-mass spectrometry data sets may be preprocessed, so that they contain lists of peaks at different mass-to-charge ratios for each retention time interval.

A feature, i.e. an eluting peak in the trace, is detected based on the evaluation of consecutive points. Preferably, the identification of a feature and the determination of its position are performed based on a point of steepest ascent. A point of steepest ascent can be determined iteratively by evaluating differences in intensity between consecutive points.

In particular, a feature can be identified and/or a point can be determined as point of steepest ascent, when one or more, preferably all, of the following criteria are fulfilled:

Both the difference in intensity between the point of steepest ascent and the immediately preceding point as well as the difference in intensity between the immediately subsequent point and the point of steepest ascent are bigger than a predetermined threshold for points in a fixed raster; for data points with a variable distance, preferably intensity difference per time distance is evaluated.

The slope immediately preceding the point of steepest ascent and the slope directly after the point of steepest ascent are compared to a predetermined threshold. Preferably, the predetermined threshold has a constant value; in particular, the value may be zero. According to a particularly preferred embodiment of the invention, a whole trace is evaluated iteratively. The first point fulfilling this slope criterion is chosen as point of steepest ascent; when a point with both a higher preceding slope and a higher subsequent slope is found before the other criteria are fulfilled, this point is chosen as point of steepest ascent.

For the data points in a predefined first time interval prior to the point of steepest ascent, the intensity is higher than a predefined threshold and/or does not contain a local minimum.

Checking for sufficient signal intensity preceding a point of steepest ascent diminishes the probability of false peak detection due to statistical noise in low intensity regions of the trace. In the example of FIG. 2b), the predefined threshold is indicated by $I_0$. The first peak depicted in the trace is not identified as a feature, because the intensity prior to the peak is too low. The predefined time interval for the intensity criterion may differ from the time interval for the monotonic rising condition; in particular it may be longer.

Excluding regions close to local minima of the intensity limits the density of identified features; in the shown example, this criterion is not applied (checked).

For at least one subsequent point in the data set, the intensity is less than or equal to the intensity at the point of steepest ascent.

For the determination of a return point, i.e. a point that has the same intensity as the point of steepest ascent, interpolation of the intensity between adjacent points may be advantageous. Alternatively, the last point with a higher intensity than that of the point of steepest ascent may be chosen as return point, when the following point has a lower intensity. In the example of FIG. 2b), point 201 is determined as point of steepest ascent; the time position of this point is denoted by $T_p$ and the intensity is indicated by $I_p$.

The return point 202 has the same intensity (within a given tolerance) and the time position $T_r$.

The position of a feature may be determined to be the time coordinate of the point of steepest ascent. Alternatively, the position of the feature may be determined based on the positions of the point of steepest ascent and the return point. In the shown example, the position $T_f$ of the feature is determined by averaging $T_p$ and $T_r$.

Figure 3:
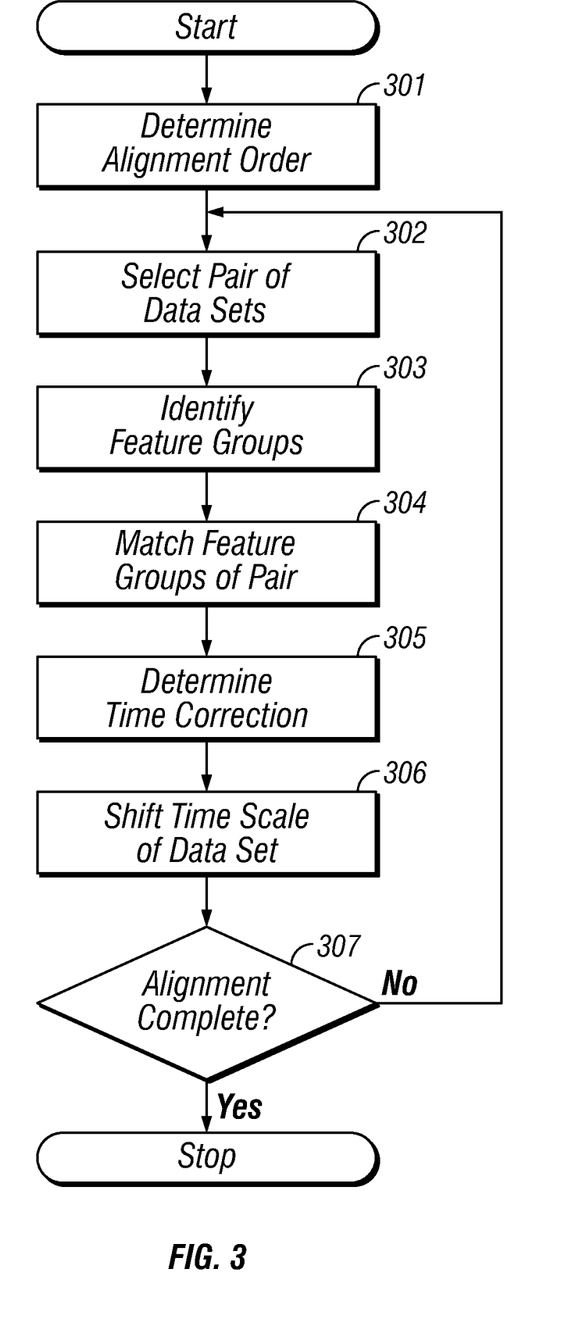
FIG. 3 shows a schematic diagram with the steps of a preferred embodiment of the method according to the invention.

FIG. 3 shows a schematic diagram with the steps of a preferred embodiment of a method according to the invention.

In Step 301, the Alignment Order is determined. According to one embodiment of the invention, the alignment order is determined by the user and stored in a tree; this allows for taking into account knowledge of the user about relations between the different data sets when aligning the data sets to a common time scale. In particular, a graphical user interface may be provided for entering the desired alignment order.

According to an alternative embodiment of the invention, an automatic determination of the alignment order is carried out; preferably, for data sets measured in consecutive time periods $T_1$ to $T_N$, data set $T_N$ is aligned to immediately preceding data set $T_{N-1}$. The combined data set is then aligned to immediately preceding data set $T_{N-2}$. Preferably, the alignment procedure is carried out iteratively until all files are aligned to the first data $T_1$. This strategy is particularly suitable for slow drifts of the instrument, where data set $T_N$ is shifted only slightly relative to data set $T_{N-1}$, but may be shifted considerably relative to the first data set $T_1$.

According to a further alternative embodiment of the invention, the alignment order is determined based on a similarity index of the files and/or additional study variables such as properties of the sample or the instrument used for measuring the data set. The similarity index may e.g. be determined based on the number of matches between two data sets. Preferably, data sets with the highest number of matching feature groups are aligned.

In step 302, a pair of data sets is selected for alignment based on the determined alignment order. Different chromatography-mass spectrometry data sets may be stored as individual files in the file system of the data processing device.

An identification of feature groups in the selected data sets is carried out in step 303. Features may be determined as discussed above (cf. FIG. 2b)). Grouping of features is carried out for features having the same retention time (within a given tolerance). In particular, features may be identified by a position and a maximum intensity such as given in a mass-peak-list. Preferably, features having a predefined mass-to-charge ratio difference and a predefined intensity pattern are grouped; such a group may in particular correspond to the isotopic pattern of a molecule/an ion.

The difference between adjacent features in an isotopic pattern depends on the charge state z of the ion. Preferably, a list of identified features is scanned for features having a predefined mass-to-charge ratio difference (within a given tolerance). This difference may be given by 1/z, and a maximum value (such as 3) for the charge state may be predefined.

According to a particularly preferred embodiment of the invention, starting from the feature with the smallest mass-to charge ratio, the intensities of features with a corresponding mass-to-charge ratio difference are compared to expected intensities for an isotopic pattern. Preferentially, the isotopic pattern is chosen so that the feature with the lowest m/z-value has the highest intensity, and corresponding features with a higher m/z value have a smaller intensity. In principle, arbitrary isotopic pattern/intensity ratios may be predefined; this allows for taking into account the isotopic pattern for specific elements.

According to an alternative particularly preferred embodiment of the invention, starting from the feature having the highest intensity, neighbouring features having a predefined intensity ratio relative to the most intense feature may be searched.

Figure 4A:
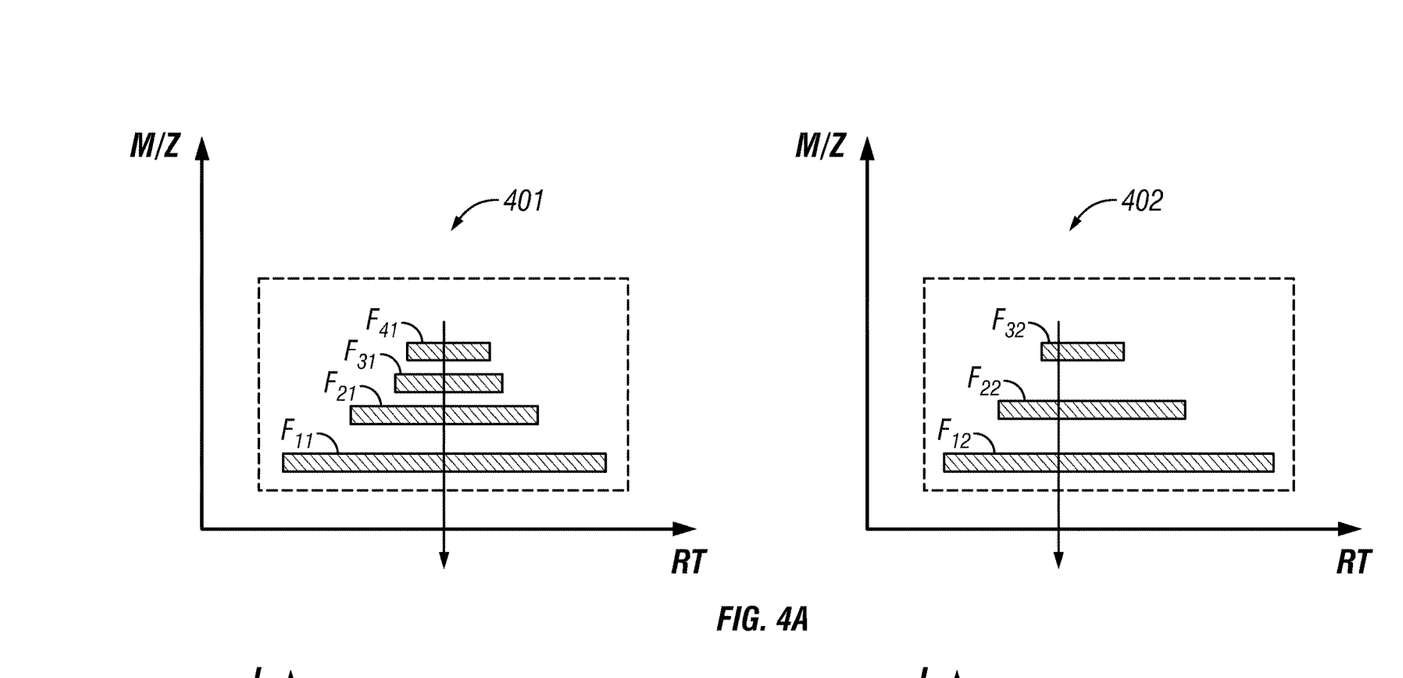
FIG. 4a) shows a simplified view of extracts of two example data sets to be aligned, and FIG. 4b) shows the corresponding examples of intensity patterns.
Figure 4B:
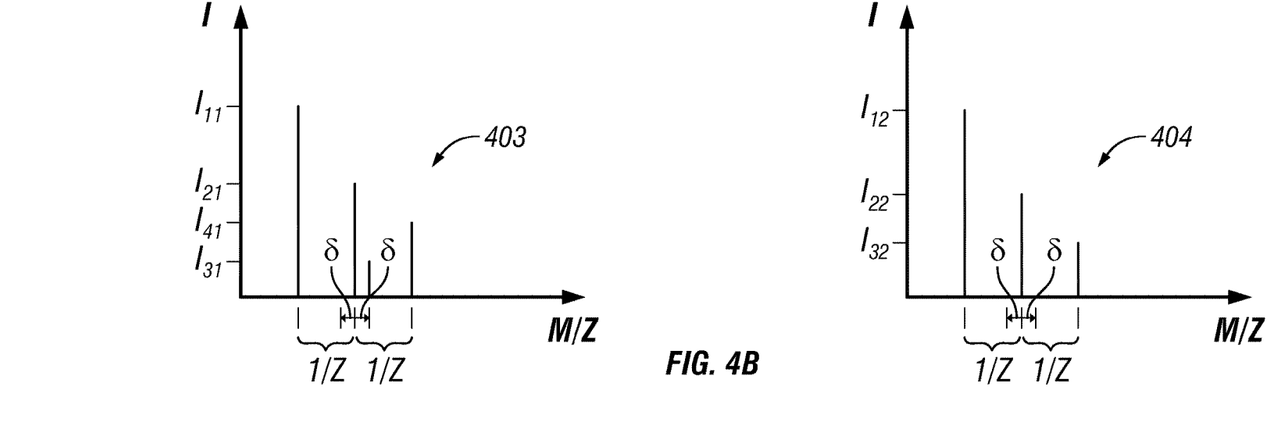

In step 304, feature groups of the first data set are matched to feature groups of the second data set in the selected pair. A detailed discussion of the matching of feature groups will be given below in connection with FIG. 4.

Based on the matched feature groups, a correction for the time scale of the second data set is determined in step 305. Preferably, time differences between matching feature groups in the first and second data sets are determined and stored. A predetermined function is adjusted to the stored differences. The predetermined function may be a polynomial, a locally defined function or may be given for individual points, preferably combined with an interpolation between points. The adjustment of the predefined function to the determined differences may be carried out using in principle arbitrary known algorithms for curve fitting to scatter plots. In a preferred embodiment of the invention, a support vector regression algorithm may be used for the adjustment. Alternatively, an algorithm such as locally weighted scatterplot smoothing may be used. In principle, arbitrary fitting algorithms and predefined functions may be used.

In step 306, the time scale of the second data set is shifted according to the determined correction. A new time coordinate for data points in the second data set is calculated based on the adjusted predefined function. Additionally, a merged data set may be calculated based on the summed or averaged intensities of the first data set and the second data set with adjusted time scale.

Step 307 contains a check if the alignment is complete; this is the case when all data sets are aligned to the main reference data set. Otherwise, a new pair of data sets is selected in step 302 and the method continues until all data sets have a corrected time scale.

Generally a different order of the steps may be used; e.g. features in one or all of the data sets may be identified in a first step and a feature list may be stored for each data set. Matching is performed pair wise using the feature lists for the selected pair of data sets. This minimizes computational expense and recalculation of already calculated results.

Referring to FIG. 4, the matching of feature groups between a first and a second data set will be discussed; a detail of a first data set is depicted on the left side of the picture, whereas a detail of a second data set is depicted on the right side of the picture. FIG. 4a) shows a simplified view of extracts of two example data sets to be aligned, and FIG. 4b) shows examples of the respective intensity patterns corresponding to an isotopic pattern of a molecule. The time scale of the second data set is generally shifted by an unknown amount relative to the first data set.

In FIG. 4a), an interval of mass-to-charge ratio m/z and retention RT is show, which contains a number of identified features; each feature is depicted as rectangle delimited by a point of steepest ascent and the corresponding return point. The extract 401 of the first data set comprises the same mass-to-charge ratio interval and a similar (but possibly shifted) retention time interval as the extract 402 of the second data set. Four features, $F_{11}$, $F_{21}$, $F_{31}$ and $F_{41}$ are present in the first data set and share a common retention time interval.

FIG. 4b) shows the intensity I of identified features depending on their mass-to-charge (m/z) centre position. An extract 403 of the first data set corresponding to the indicated cut in 401 is depicted. Feature $F_{11}$ has the lowest m/z-value and the highest intensity $I_{11}$; feature $F_{21}$ has a higher m/z-value and a lower intensity $I_{21}$; features $F_{31}$ and $F_{41}$ have a respective higher m/z-value and lower $I_{31}$ and $I_{41}$. The difference in m/z-values between feature $F_{11}$ and $F_{21}$ is 1/z within a tolerance of δ, indicating a singly charged ion. Within the tolerance interval of ±δ, feature $F_{31}$ is also in a distance of 1/z relative to $F_{11}$; as a consequence, any of both features could be part of an isotopic pattern. The difference in m/z-values between feature $F_{41}$ and $F_{21}$ or $F_{31}$ is also 1/z within the given tolerance; alternatively one could determine that the difference in m/z-value between feature $F_{41}$ and $F_{11}$ is 2/z or generally n/z (with an integer n). Thus the features $F_{11}$, $F_{21}$, $F_{31}$ and $F_{41}$ conform to a predefined condition with respect to the difference in mass-to-charge ratio. In addition, they conform to a predefined condition with respect to the intensity ratio (i.e. the intensity is decreasing monotonically with increasing mass-to-charge ratio). As a consequence, these four features are grouped in a feature group (indicated by a surrounding dashed rectangle in FIG. 4a)).

An extract 402 of the second data set in FIG. 4a) contains three identified features $F_{12}$, $F_{22}$ and $F_{32}$ depicted as rectangles defined by the point of steepest ascent and the respective return point. Below, an extract 404 of the second data set corresponding to the indicated cut in 402 is shown. The differences in m/z-values conform to a 1/z criterion for a singly charged ion within the given tolerance S. Further, the intensities $I_{12}$ (of feature $F_{12}$), $I_{22}$ (of feature $F_{22}$) and $I_{32}$ (of feature $F_{32}$) comply with the predefined criterion of decreasing intensity with increasing mass-to-charge value. As a result, features $F_{12}$, $F_{22}$ and $F_{32}$ are grouped (the feature grouped is indicated by a dashed rectangle in FIG. 4a)).

In order to determine matching feature groups of the first data set and the second data set, the mass-to-charge centre positions of the features in a group of the first data set are compared to the mass-to-charge centre positions of the features in a group of the second data set. Preferable a score for the similarity of the feature groups is determined. In particular, the similarity score may be derived based on the number of peaks that have an identical position (within a predefined tolerance interval). For the current example a similarity score of 3 will result from the comparison of the feature groups, because $F_{11}$ and $F_{12}$, $F_{21}$ and $F_{22}$, $F_{41}$ and $F_{32}$ are found to have the same position, whereas no feature corresponding to $F_{31}$ is present in the second data set.

Preferably, the similarity score is compared to a predefined threshold, in particular 2. For the current example, the score is higher than the threshold; as a result the feature groups in the first and the second data set are determined to be matching feature groups. The difference in retention time position between matching feature groups in the first and the second data set are taken into account for determining a corrected time scale.

Additional conditions may be checked before a matching of feature groups can be identified. In particular, the value of the intensity ratio between peaks in the second data set may need to be identical (within a given tolerance) to the value of the intensity ratio between peaks in the first data set with a corresponding m/z-distance.

Figure 5A:
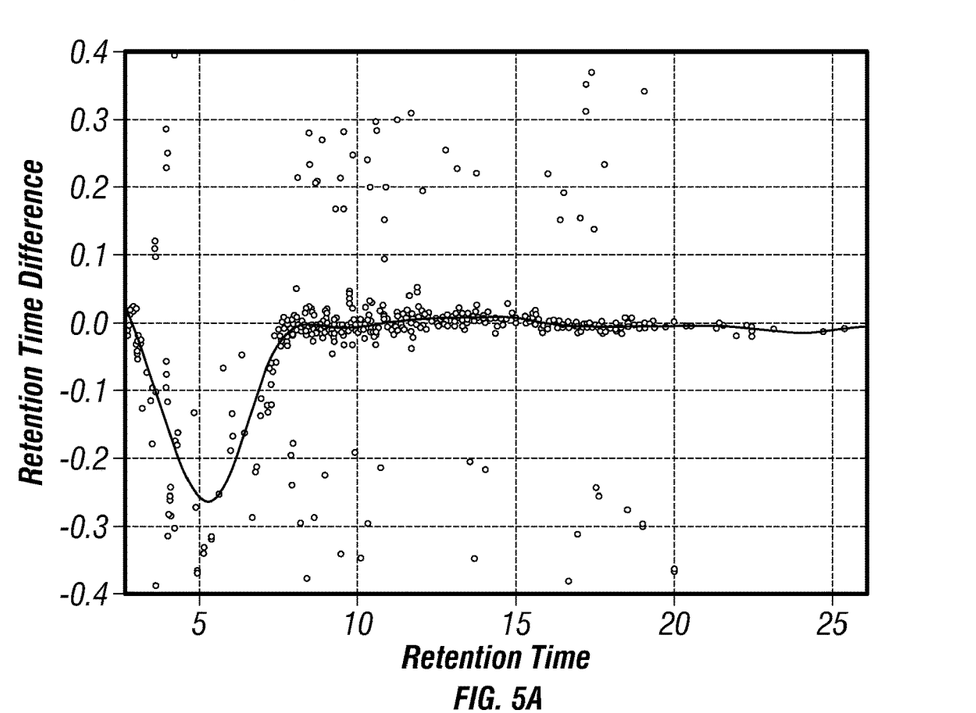
FIG. 5a) shows an exemplary diagram of deviations in the retention time between matching features in two data sets and FIG. 5b) shows a direct comparison between corresponding traces of a first data set and of a second data set before and after alignment.

FIG. 5a) shows an exemplary diagram of deviations in the retention time between matching features in two data sets. In the diagram, the difference in retention time between a feature group in the first data set and a matching feature group in the second data set is shown as a function of the retention time. A predefined function is adjusted to a scatterplot of the determined differences in positions of matching feature groups. The predefined function is contiguous and smooth, exhibiting a negative retention time difference with a maximum absolute value around 5 minutes retention time; for times of 7 minutes and later, the function is close to zero. It can be seen from the diagram that most of the points lie close to the adjustment function and that the number of outliers is relatively small As a result the correction represents the data well, and a robust and reliable determination of the corrected time scale can be carried out.

Figure 5B:
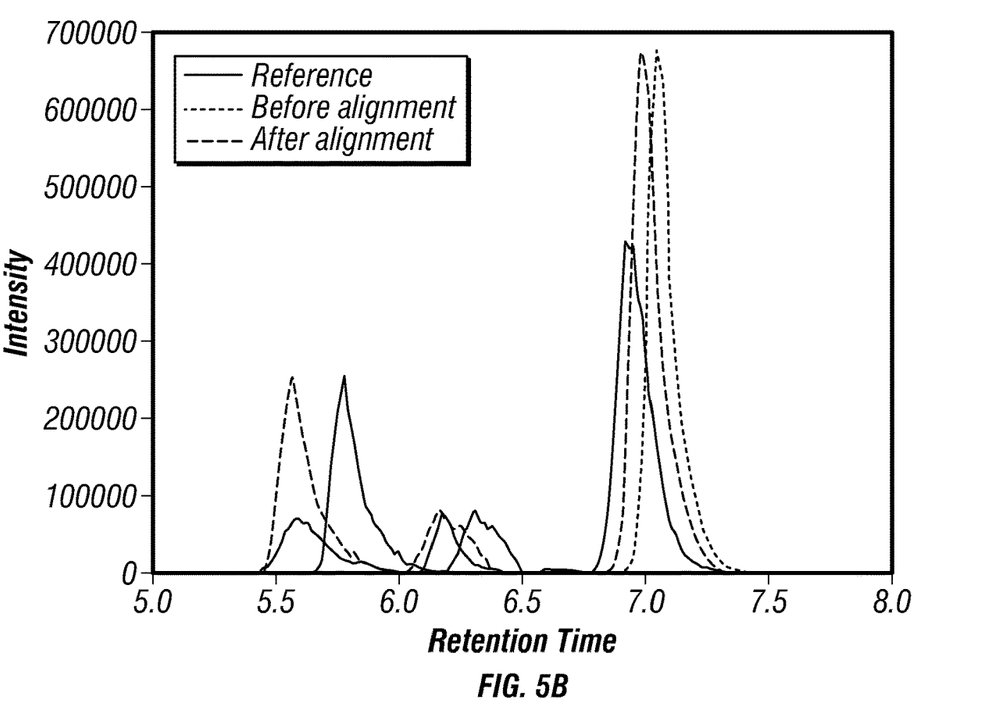

FIG. 5b) shows a direct comparison between corresponding traces of a first data set and of a second data set before and after alignment. In the diagram, intensity is plotted as a function of retention time between 5 and 8 minutes retention, i.e. in the region of the strong negative deviation in the upper figure. A trace of the first data set, the reference data set, is shown as a full line; the corresponding trace of the second data set is shown as dotted line before alignment and as dashed line after alignment of the timescale of the second data set to that of the first data set. Corresponding features of the data set show a considerably improved match. This allows for a better visual comparison and/or a more meaningful evaluation of corresponding features.

As used herein, including in the claims, unless the context indicates otherwise, singular forms of the terms herein are to be construed as including the plural form and vice versa.

Throughout the description and claims of this specification, the words "comprise", "including", "having" and "contain" and variations of the words, for example "comprising" and "comprises" etc., mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language ("for instance", "such as", "for example" and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The invention claimed is:

1. A mass spectrometry system, comprising:
  a liquid chromatography column;
  a mass spectrometer with an electrospray ionization source coupled to the liquid chromatography column; and
  a processor communicatively coupled to the mass spectrometer, the processor adapted to process chromatography-mass spectrometry data sets, and the processor for saving and/or retrieving the chromatography-mass spectrometry data sets;

and a memory containing non-volatile computer readable instructions that, when executed by the processor, cause the processor to initiate the performance of a method comprising the steps of:

identifying feature groups each comprising at least two features of different mass-to-charge ratio in a first data set by evaluating intensities of consecutive points of the first data set, wherein the at least two features of the first data set occur at a same retention time within a given tolerance;

identifying feature groups each comprising at least two features of different mass-to-charge ratio in a second data set by evaluating intensities of consecutive points of the second data set, wherein the at least two features of the second data set occur at a same retention time within a given tolerance, wherein the steps of identifying feature groups in the first and second data sets comprise identifying the at least two features in each respective data set by determining points of steepest ascent, wherein:

the step of identifying feature groups in the first data set and the step of identifying feature groups in the second data set comprise grouping of features in the respective feature groups of the first and second data sets;

the features are grouped into respective feature groups when one or more predefined conditions are fulfilled; and the grouping of the at least two features in each feature group comprises identifying a feature with maximum intensity and identifying one or more features with higher and/or lower mass-to-charge ratio relative to the feature with maximum intensity, so that a difference in mass-to-charge ratio is in a predefined mass-to-charge ratio interval within a given mass-to-charge tolerance;

matching identified feature groups of the first data set to identified feature groups of the second data set; and determining a corrected time scale for the second data set based on time differences between the feature groups in the first data set and the matching feature groups in the second data set; and adjusting, based on the corrected time scale for the second data set, a time scale of the chromatography-mass spectrometry data sets by modifying the second data set in accordance with the corrected time scale to align the feature groups in the first data set to corresponding feature groups in the second data set, wherein a time position of a feature of the at least two features in the first and second data sets is determined based on a point in a time interval delimited by a point of steepest ascent of the points of steepest ascent in the data set and a return point, wherein the return point is a first point after the point of steepest ascent for which intensity of the return point is equal to that of the point of steepest ascent within a given intensity tolerance.

2. The mass spectrometry system of claim 1, wherein a feature is identified and/or a point is determined to be a point of steepest ascent of the points of steepest ascent when at least one of the following criteria is fulfilled:

(i) both a difference in intensity per retention time between the point of steepest ascent and an immediately preceding point as well as a difference in intensity per difference in retention time between an immediately subsequent point and the point of steepest ascent are bigger than a predetermined threshold;

(ii) for data points in a predefined first time interval prior to the point of steepest ascent, intensity of the data points in a predefined first time interval prior to the point of steepest ascent is higher than a predefined threshold and/or rises monotonically; and (iii) for at least one other subsequent point in the data set, intensity of the at least one other subsequent point in the data set is less than or equal to the intensity at the point of steepest ascent.

3. The mass spectrometry system of claim 1, wherein a predefined condition is fulfilled, when the at least two features of the first or second data sets include three features including first, second and third features, and a difference in mass-to-charge ratio between the first and second features is equal, within a given mass-to-charge ratio tolerance, to a difference in mass-to-charge ratio between the second and third features.

4. The mass spectrometry system of claim 1, wherein a predefined condition is fulfilled, when the at least two features of the first or second data sets include three features including first, second and third features and an intensity ratio of the first, second and third features corresponds to a predefined pattern.

5. The mass spectrometry system of claim 1, wherein determining a corrected time scale comprises adjusting a predefined function based on the time differences between the feature groups identified in the first data set and corresponding to the matching feature groups identified in the second data set.

6. The mass spectrometry system of claim 5, wherein the predefined function is composed of defined functions and/or the adjusting the predefined function is support vector regression or weighted scatterplot smoothing.

7. The mass spectrometry system of claim 1, wherein more than two data sets are aligned, and wherein the alignment is at least partially or initially performed pair wise, so that in a first step, a subordinate data set is aligned to an intermediate reference data set, and in a further step, a number of data sets comprising the intermediate reference data set and the subordinate data set are aligned to a primary reference data set.

8. The mass spectrometry system of claim 7, wherein an order of pair wise alignment is chosen according to a time of measurement of a data set and/or a similarity index for comparing the more than two data sets.

9. A mass spectrometry system, comprising:

a mass spectrometer configured to be coupled to a liquid chromatography column; and a processor communicatively coupled to the mass spectrometry system, the processor adapted to process chromatography-mass spectrometry data sets, and the processor for saving and/or retrieving the chromatography-mass spectrometry data sets; and a memory containing non-volatile computer readable instructions that, when executed on the processor, cause the processor to carry out a method comprising the steps of:

identifying feature groups each comprising at least two features of different mass-to-charge ratio in a first data set by evaluating intensities of consecutive points of the first data set, wherein the at least two features of the first data set occur at a same retention time within a given tolerance;

identifying feature groups each comprising at least two features of different mass-to-charge ratio in a second data set by evaluating intensities of consecutive points of the second data set, wherein the at least two features of the second data set occur at a same retention time within a given tolerance, wherein the steps of identifying feature groups in the first and second data sets comprise identifying the at least two features in each respective data set by determining points of steepest ascent, wherein:

the step of identifying feature groups in the first data set and the step of identifying feature groups in the second data set comprise grouping of features in the respective feature groups of the first and second data sets;

the features are grouped into respective feature groups when one or more predefined conditions are fulfilled; and a predefined condition is fulfilled, when the at least two features of the first or second data sets include three features including first, second and third features, and a difference in mass-to-charge ratio, within a given mass-to-charge ratio tolerance, between the first and second features is equal to a difference in mass-to-charge ratio between the second and third features;

matching identified feature groups of the first data set to identified feature groups of the second data set; and determining a corrected time scale for the second data set based on time differences between the feature groups in the first data set and the matching feature groups in the second data set; and adjusting, based on the corrected time scale for the second data set, a time scale of the chromatography-mass spectrometry data sets by modifying the second data set in accordance with the corrected time scale to align the feature groups in the first data set to corresponding feature groups in the second data set.

10. The mass spectrometry system of claim 9, wherein a feature is identified and/or a point is determined to be a point of steepest ascent of the points of steepest ascent when at least one of the following criteria is fulfilled:

(i) both a difference in intensity per retention time between the point of steepest ascent and an immediately preceding point as well as a difference in intensity per difference in retention time between an immediately subsequent point and the point of steepest ascent are bigger than a predetermined threshold;

(ii) for data points in a predefined first time interval prior to the point of steepest ascent, intensity of the data points in a predefined first time interval prior to the point of steepest ascent is higher than a predefined threshold and/or rises monotonically; and (iii) for at least one other subsequent point in the data set, intensity of the at least one other subsequent point in the data set is less than or equal to the intensity at the point of steepest ascent.

11. The mass spectrometry system of claim 10, wherein determining a corrected time scale comprises adjusting a predefined function based on the time differences between the feature groups identified in the first data set and corresponding to the matching feature groups identified in the second data set.

12. The mass spectrometry system of claim 11, wherein the predefined function is composed of defined functions and/or the adjusting the predefined function is support vector regression or weighted scatterplot smoothing.

13. The mass spectrometry system of claim 10, wherein more than two data sets are aligned, and wherein the alignment is at least partially or initially performed pair wise, so that in a first step, a subordinate data set is aligned to an intermediate reference data set, and in a further step, a number of data sets comprising the intermediate reference data set and the subordinate data set are aligned to a primary reference data set.

14. The mass spectrometry system of claim 13, wherein an order of pair wise alignment is chosen according to a time of measurement of a data set and/or a similarity index for comparing the more than two data sets.

15. The mass spectrometry system of claim 9, wherein a predefined condition is fulfilled, when the at least two features of the first or second data sets include three features including first, second and third features and an intensity ratio of the first, second and third features corresponds to a predefined pattern.

16. The mass spectrometry system of claim 9, wherein grouping of the at least two features in each feature group comprises identifying a feature with maximum intensity and identifying one or more features with higher and/or lower mass-to-charge ratio relative to the feature with maximum intensity, so that a difference in mass-to-charge ratio is in a predefined mass-to-charge ratio interval within a given mass-to-charge tolerance.

17. A mass spectrometry system, comprising:

a liquid chromatography column;

a mass spectrometer with an electrospray ionization source coupled to the liquid chromatography column; and a processor communicatively coupled to the mass spectrometer, the processor adapted to process chromatography-mass spectrometry data sets, and the processor for saving and/or retrieving the chromatography-mass spectrometry data sets;

and a memory containing non-volatile computer readable instructions that, when executed by the processor, cause the processor to initiate the performance of a method comprising the steps of:

identifying feature groups each comprising at least two features of different mass-to-charge ratio in a first data set by evaluating intensities of consecutive points of the first data set, wherein the at least two features of the first data set occur at a same retention time within a given tolerance;

identifying feature groups each comprising at least two features of different mass-to-charge ratio in a second data set by evaluating intensities of consecutive points of the second data set, wherein the at least two features of the second data set occur at a same retention time within a given tolerance, wherein the steps of identifying feature groups in the first and second data sets comprise identifying the at least two features in each respective data set by determining points of steepest ascent;

matching identified feature groups of the first data set to identified feature groups of the second data set; and determining a corrected time scale for the second data set based on time differences between the feature groups in the first data set and the matching feature groups in the second data set; and adjusting, based on the corrected time scale for the second data set, a time scale of the chromatography-mass spectrometry data sets by modifying the second data set in accordance with the corrected time scale to align the feature groups in the first data set to corresponding feature groups in the second data set, wherein a time position of a feature of the at least two features in the first and second data sets is determined based on a point in a time interval delimited by a point of steepest ascent of the points of steepest ascent in the data set and a return point, wherein the return point is a first point after the point of steepest ascent for which intensity of the return point is equal to that of the point of steepest ascent within a given intensity tolerance; and wherein more than two data sets are aligned, and wherein the alignment is at least partially or initially performed pair wise, so that in a first step, a subordinate data set is aligned to an intermediate reference data set, and in a further step, a number of data sets comprising the intermediate reference data set and the subordinate data set are aligned to a primary reference data set.

\* \* \* \* \*